United States Patent [19]

Gegner

[11] Patent Number: 5,477,131
[45] Date of Patent: Dec. 19, 1995

[54] ZERO-VOLTAGE-TRANSITION SWITCHING POWER CONVERTERS USING MAGNETIC FEEDBACK

[75] Inventor: Joel P. Gegner, Oak Park, Ill.

[73] Assignee: Motorola, Inc., Schaumburg, Ill.

[21] Appl. No.: 116,085

[22] Filed: Sep. 2, 1993

[51] Int. Cl.⁶ .................................................. G05F 1/613
[52] U.S. Cl. .......................... 323/222; 323/254; 323/263; 323/339; 323/344
[58] Field of Search ...................................... 323/222, 249, 323/254, 259, 261, 263, 282, 290, 329, 339, 344, 345, 351

[56] References Cited

U.S. PATENT DOCUMENTS

| 3,569,817 | 3/1971 | Boehringer | 323/222 |
| 4,510,400 | 4/1985 | Kiteley | 323/222 |
| 4,987,361 | 1/1991 | Ohms | 323/222 |
| 5,001,620 | 3/1991 | Smith | 323/222 |

*Primary Examiner*—Jeffrey L. Sterrett

[57] ABSTRACT

A soft-switching circuit for achieving zero-voltage-transition (ZVT) type commutation in switching power converters includes a magnetic feedback circuit for achieving substantially zero voltage turn on of the active power switches and for achieving zero voltage turn off of the passive power switches of the switching power converter.

24 Claims, 11 Drawing Sheets

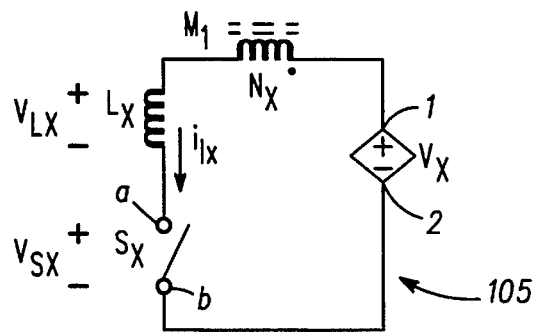
FIG. 5
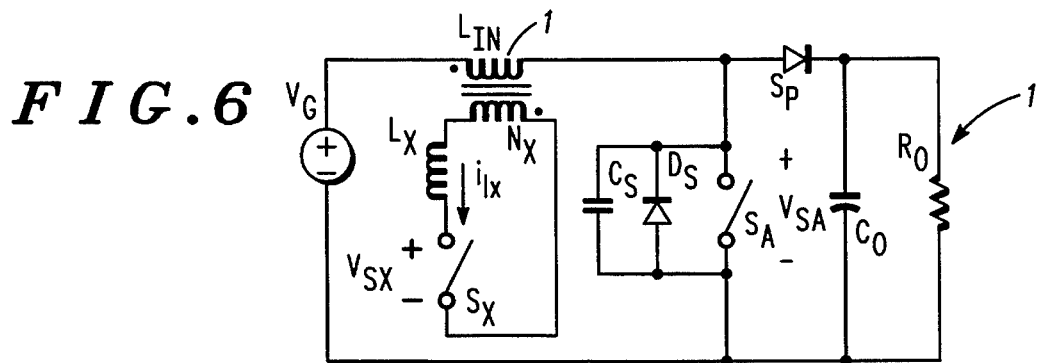
FIG. 6
FIG. 7
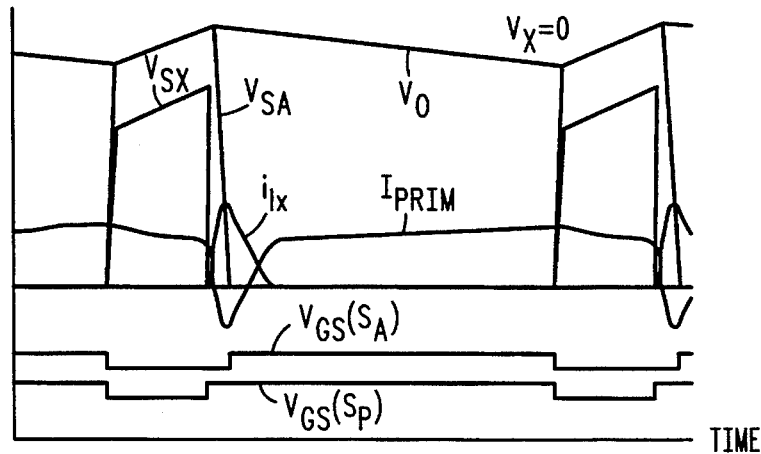
FIG. 8
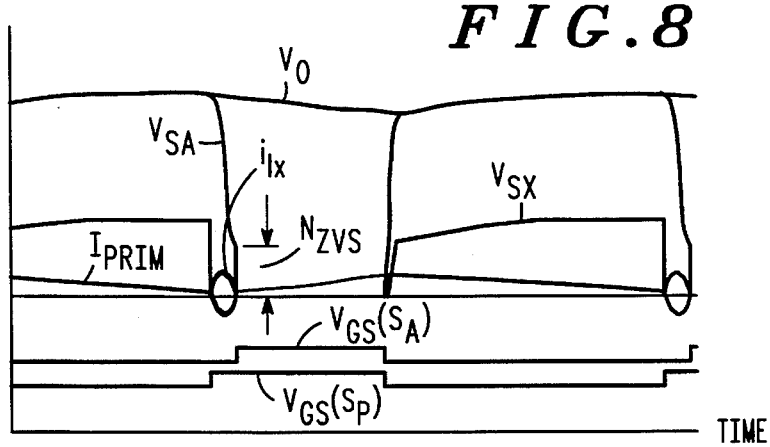

ZERO-VOLTAGE-TRANSITION SWITCHING POWER CONVERTERS USING MAGNETIC FEEDBACK

FIELD OF THE INVENTION

This invention relates generally to switching power converters and more particularly to providing a zero voltage transition enabling circuit for use therewith.

BACKGROUND OF THE INVENTION

Over the last few years, a number of so called Zero-Voltage-Transition (ZVT) techniques have been presented. ZVT is a special case of Zero-Voltage-Switching (ZVS) wherein the voltage across a pair of ZV switched semiconductors change equally and oppositely. In this way the voltage across one device transitions from zero to another value, while the voltage across the other device decreases from that same value to zero. In conventional single-ended converters, these devices include an active switch and a rectifier. In half and full-bridge topologies, this pair of devices may be two switches in the leg of a switching bridge, or two diodes in the leg of a bridge rectifier.

Strictly speaking then, a large number of conventional converters may be categorized as ZVT topologies. These would include quasi-square-wave converters (QSWC's), as well as many zero-voltage-switching (ZVS) half and full-bridge topologies. The term ZVT has more recently been associated with a smaller class of topologies within the larger ZVT family. These topologies have the additional characteristic of possessing a soft-switching mechanism that more closely resembles an active snubber as opposed to a resonant tank (as would be found in Quasi-resonant Converters (QRC), Quasi-square wave Converters (QSWC), Multi-Resonant Converters (MRC), and Resonant converters. Conventional soft-switching techniques place the resonant circuitry in cascade with the main power flow, thus forcing it to be rated for full power. This special class of ZVT topologies (referred to simply as ZVT converters hereafter) places the resonant (soft-switching) circuitry in parallel with the power stage.

The advantage gained by this implementation is that the additional circuitry need not be rated for the total converter output power, but rather for just a fraction of that power. During most of the switching cycle, this circuitry is inactive, and incurs no loss. Only near switching transitions does the circuitry become active, enabling the main active and passive switches to commute on and off with ZVS. The drawback to this type of conventional soft-switching technique is the usual addition of an auxiliary active switch.

To accomplish ZVS switching of the active and passive power switches the ZVT auxiliary circuitry must perform several tasks: It must first provide an auxiliary path for the current flowing through the passive power switch (or rectifying switch if synchronous rectification is being used). As long as the passive power switch is on, the active switch voltage cannot return to zero. Secondly, the auxiliary circuitry must displace the charge stored across the active and passive power switches such that the active power switch voltage decreases to zero for ZVS turn-on. In other words, the energy stored in the switch capacitance must be transferred to elsewhere in the circuit such that it is not dissipated when the power switch is turned on. Finally, the current flowing through the auxiliary circuitry must return to a negligible amount (ideally zero) so that its effect on the converter operation is minimized.

Conventional ZVT techniques may be judged according to component stresses, switching losses, range of ZVS operation, simplicity, and feasibility of implementation. Several techniques have recently been presented.

One technique proposed is shown implemented for a Boost converter (101) in FIG. 1. The auxiliary circuitry (101A) consisting of a switch $S_x$, a diode $D_x$, and a resonant inductor $L_x$ are high-lighted in a dashed box. The principle of operation for this converter may be simply stated: Once the active power switch S has turned off, input current $I_g$ charges the switch capacitance $C_s$ until its voltage reaches the output voltage, turning on rectifying diode $D_r$. At the end of the switching cycle when the active power switch S is to be turned on, the auxiliary switch $S_x$ is first turned on with zero-current-switching (ZCS). A positive di/dt across the auxiliary inductor $L_x$ causes its current to increase linearly. Once the current equals that of the input inductor $L_i$, the rectifying diode $D_r$ turns off inductor $L_x$ and capacitor $C_s$ resonate together until the voltage across the active power switch S equals zero. This switch may then be turned on with ZVS, and the negative di/dt across the auxiliary inductor $L_x$ causes its current to decrease linearly to zero. Once at zero, diode $D_x$ blocks any negative current flow, and the auxiliary switch $S_x$ may turn off with ZCS.

Although simple, the technique proposed possesses several drawbacks. First and foremost, ZVS operation of the active power switch S is possible only when the output voltage $V_o$ of the Boost converter is greater than twice the input voltage $V_g$. Secondly, the auxiliary switch is not source common with the main power switch S. Therefore a floating gate drive or a bootstrap drive is necessary. Thirdly, the current flowing through the auxiliary circuit (101A) flows back into the input source thus effectively chopping the input current at every turn-on transition. This may be undesirable in some designs. Finally, it should be noted that the peak auxiliary current is equal to the input current $I_g$ plus an additional circulating current equal to the output voltage $V_o$ divided by the characteristic impedance $$Z_o = \sqrt{\frac{L_x}{C_s}} \times$$

In off-line applications (for example Power Factor Correction), Circulating currents can easily exceed 4 Amps. Therefore, the peak auxiliary current is typically equal to the input current $I_g$ plus an additional 4 Amps.

Another conventional technique proposed appears similar to the technique discussed above. The auxiliary circuit (102A) high-lighted by dashed lines in FIG. 2 connects to the output rather than the input as in FIG. 1. In addition, a capacitor $C_x$ is added in parallel with diode $D_x$. This circuit operates on a principle similar to the one presented hereinabove, except the voltage on the additional capacitor $C_x$ (equal to twice the output voltage $V_o$ when the active power switch is off) enables the converter (102) to achieve ZVS when the output voltage $V_o$ is below as well as above twice the input voltage $V_g$. In comparison to the technique presented earlier, this technique possesses the additional advantage of not circulating current in the auxiliary circuit back to the input thus effectively chopping the input current. However, undesirable high peak currents and a floating drive are characteristic of this technique. In addition, the voltage stress on the auxiliary switch $S_x$ is equal to twice the output voltage $V_o$. Finally, it should be noted that the turn-off time of the auxiliary switch $S_x$ is critical. While current flows through the parallel diode Dsx, switch $S_x$ must be turned on. This requirement also adds complexity to the control circuit (not shown).

This technique is implemented for a Boost converter (103) as shown in FIG. 3. Its operation may be explained as follows: With the input current $I_g$ flowing to the output through the rectifier diode $S_p$ the voltage across switch $S_a$ is clamped at the output voltage. To reduce the voltage across the switch to zero prior to turning the switch on, an auxiliary switch $S_x$ is turned on with zero current. Current through the auxiliary inductor $L_x$ increases linearly from zero until it reaches the input current. Rectifier diode $S_p$ turns off, and any further increase in the auxiliary inductor current must come from the switch capacitance $C_s$. This inductor current does indeed increase due to the resonant behavior between $L_x$ and $C_s$. As current flows through $C_s$, the voltage across it decreases to zero. Once the voltage reaches zero, the diode $D_s$ in parallel with switch $S_A$ conducts and carries a current equal to the difference between the auxiliary inductor current and the input current. Switch $S_A$ may then be turned on. This circulating current equal to the input current plus $V_o/Z_o$ $$\left( \text{where } Z_o = \sqrt{\frac{L_x}{C_s}} \right)$$

remains constant until auxiliary switch $S_x$ is turned off. With $S_x$ off, the auxiliary inductor current flows through diode $D_{x2}$ to the output. This causes the auxiliary inductor current to decrease linearly back to zero where the series diode $D_{x1}$ will block the current from flowing negatively.

An advantage of this technique is the limited voltage stress (equal to $V_o$ for the Boost converter) on the auxiliary switch $S_x$. Nevertheless, it possesses several disadvantages: First, its peak auxiliary current stress is greater than the input current $I_g$ by an amount equal to $V_o/Z_o$ $$\left( \text{where } Z_o = \sqrt{\frac{L_x}{C_s}} \right).$$

Secondly, the on-time of the auxiliary switch is critical to minimizing the conduction losses in the auxiliary circuitry. Since the minimum on-time for this switch $S_x$ varies over load and line, the on-time of switch $S_x$ must be set to the maximum (worst case) on-time over load and line. This means that at all other operating points, the auxiliary circuit will be dissipating more energy than necessary. To remedy this problem, a variable on-time scheme would need to be implemented which would increase complexity and cost of the control circuitry. Finally, a floating drive for the auxiliary switch $S_x$ is required in a number of topologies (For example Buck type).

Another conventional technique is shown in FIG. 4 as implemented in a Boost converter (104). Two advantages accompany this technique: First, the on-time of the auxiliary switch $S_x$ is not critical to the conduction losses in the auxiliary circuitry (104A). Due to the current transformer $T_x$, the current through the auxiliary switch $S_x$ automatically decreases to zero once the voltage across the active power switch S has decreased to zero. This is independent of the turn-off of switch $S_x$. Secondly, the peak current (and thus the rms current) through the auxiliary switch can be significantly decreased. It's peak value can be as small as ½ $I_g$ less than the peak current in other conventional converters.

In spite of these advantages, such a conventional technique has several drawbacks: In comparison to the previous mentioned conventional techniques, this ZVT technique requires more components, of which most significant is an auxiliary transformer $T_x$. In addition, a number of topology implementations require floating drive circuitry for auxiliary switch $S_x$. Finally, isolated topologies are not easily implemented since transformer leakage inductance between the active power switch S and the auxiliary circuitry deteriorate the ZVS operation the switch.

SUMMARY OF THE INVENTION

The present invention provides an alternative current path such that charge stored in the parasitic switch capacitance may be removed thus enabling ZVS turn-on of the active power switch, and ZVS turn-off of the passive power switch (typically a rectifying diode). One embodiment of the present invention makes use of a secondary winding on one of the converter's filtering inductors.

In addition to this auxiliary winding on the filter inductor, a small auxiliary switch, a small auxiliary inductor, and an auxiliary voltage source are connected in series with the auxiliary winding. The switch is operated such that its turn-on activates the auxiliary circuitry, initiating a current flow in the secondary winding which is mirrored to the primary of the filter inductor. If this mirrored current is of a polarity such that it subtracts from the magnetizing current flowing through the primary, then as the current through the auxiliary circuit increases, charge stored on the active and passive power switch capacitances will be removed. The small inductor in series with the switch limits the di/dt through the auxiliary circuit thereby enabling Zero-Current-Switching (ZCS) of the auxiliary switch. The circuit is configured such that when the voltage on the active power switch reaches zero, the current in the auxiliary circuit decreases back to zero. This constitutes a type of topology inherent voltage feedback characteristic of this ZVT technique. The auxiliary switch must be a uni-directional current switch so as to block current from flowing negatively through it. Once the current decreases to zero, the auxiliary switch may be turned off with ZCS. A typical implementation of the auxiliary switch may be a MOSFET in series with a fast recovery diode which achieves the uni-directional current characteristic.

BRIEF DESCRIPTION OF THE DRAWINGS

FIG. 5 shows an auxiliary circuitry for achieving ZVT operation of the passive and active power switches according to the present invention.

FIG. 6 shows a ZVT Boost Converter where $V_x=0$ as provided by the present invention.

FIG. 7 depicts key waveforms of the converter of FIG. 6 with $V_g=90$ V, $V_o=400$ V.

FIG. 8, depicts key waveforms of the converter of FIG. 6 with $V_g=250$ V, $V_o=400$ V

DESCRIPTION OF THE PREFERRED EMBODIMENT

Figure 1:
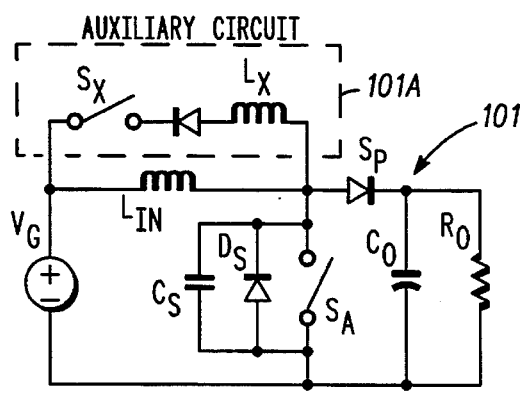
FIGS. 1–4 illustrate prior art, ZVT Boost Converters
Figure 2:
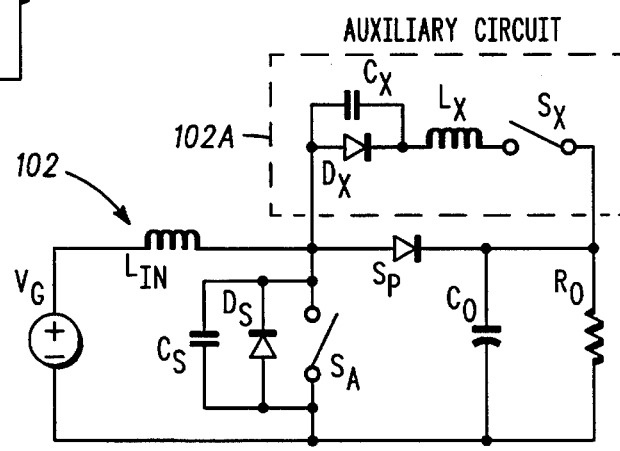
Figure 3:
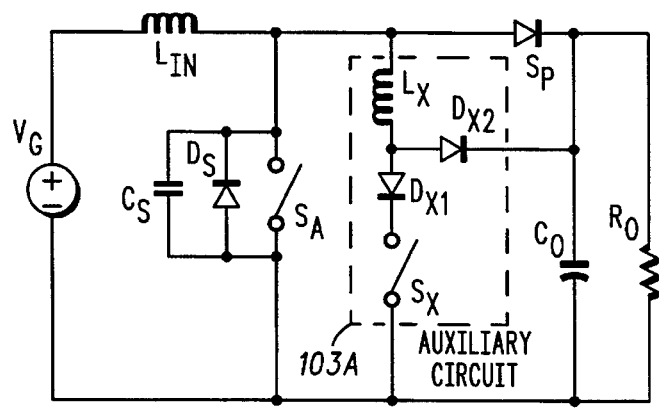
Figure 4:
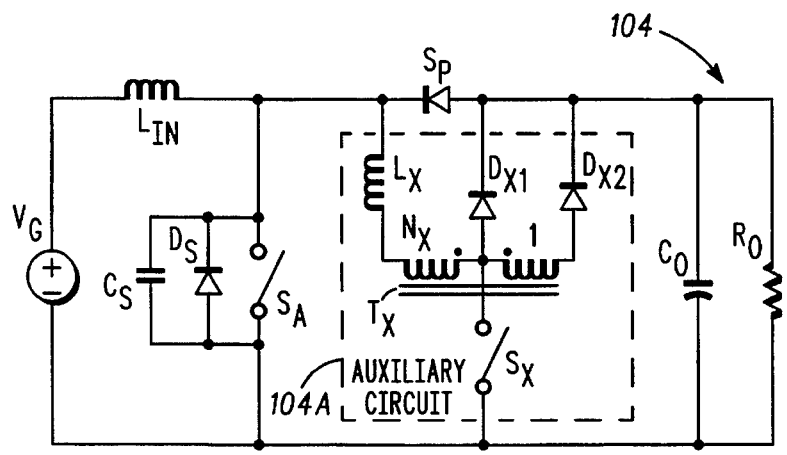

The novel characteristics of the present invention will now be pointed out and described.

The instant invention contemplates the best mode to include the following characteristics.

1. An auxiliary winding on a magnetic core.
2. An inductor and a uni-directional current switch are placed in series with the auxiliary winding.
3. The auxiliary winding interacts with the other windings as windings of a current transformer, and not as windings of an inductor. In other words, when current flows through the auxiliary winding, it is directly reflected (mirrored) to the other windings as in the case of a transformer.
4. The circuit is configured such that current increasing through the auxiliary winding forces a decrease of current flowing through the passive power switch. Eventually, the passive power switch will have no current flowing through it thus causing current to flow through the parasitic switch capacitances.
5. The circuit is configured such that once the voltage on the active power switch decreases to zero, the di/dt across the auxiliary inductor reverses thereby causing the current in the auxiliary circuit to return to zero. Hence to the term Magnetic Feedback: The collapse of the active power switch voltage is reflected through the magnetic core to the auxiliary inductor causing a reverse in di/dt polarity.

In general, the auxiliary circuit may be represented as in FIG. 5 where a secondary winding $N_x$, an inductor $L_x$, a switch $S_x$, as well as a voltage source $V_x$ are depicted. The voltage source $V_x$ represents a general dependent or independent source. As will become evident, the actual form of the voltage source $V_x$ may vary significantly, with each implementation having particular value. The following simple requirements define the possible forms of $V_x$:

1. $V_x$ must be chosen such that $$\frac{di_{Lx}}{dt} = \begin{cases} >0, S_P = \text{on} \\ <0, S_A = \text{on} \end{cases},$$

where $S_p$ and $S_A$ represent the passive and active power switches, respectively.

2. $V_x$ must be chosen such that $$\frac{di_{Lx}}{dt} \propto -\frac{di_c}{dt},$$

where $i_c$ equals the total current flowing through the active and passive power switches. For example, in the Boost convertor (described below), this current would comprise the sum of the currents flowing into the Boost active power switch, and the rectifying diode.

Several of the these novel implementations will now be presented as examples of this ZVT soft-switching technique. To illustrate the present invention, the Boost converter will be used:

EXAMPLE #1

$V_x=0$

The Boost converter shown in FIG. 6 implements the auxiliary circuitry using $V_x=0$. The operation may be described as follows with the assistance of the circuit waveforms of FIG. 7:

Stage 1: The active power switch S A turns off with ZVS, and the input current flows into the parasitic switch capacitance $C_s$. The voltage across switch S increases linearly to the output voltage $V_o$.

Stage 2: The passive power switch (rectifier) $S_p$ turns on and the input current flows to the output.

Stage 3: When the active power switch $S_A$ is turned on, the auxiliary switch $S_x$ is first turned on with ZCS. The turn-on of the switch causes the auxiliary inductor current to increase at a rate of $N_x(V_o-V_g)/L_x$. As the current increases, a proportional current is mirrored to the primary such that when the auxiliary current reaches a value of $I_m/N_x$, where $I_m$ is the DC magnetizing current in the primary of the input inductor (not shown), no current flows through the rectifier $S_p$.

Stage 4: Once the current in the auxiliary circuit reaches the value of $I_m/N_x$, the rectifier diode $S_p$ turns off, and the positive di/dt across the auxiliary inductor is provided by $V_g$ and the switch capacitance $C_s$. Auxiliary inductor $L_x$ and switch capacitance $C_s$ begin to resonate together, where at the end of a near half cycle, the switch voltage $V_s$ has collapsed to zero. Note that during this time period, the circuit may be represented by a simple L-C circuit in series with a voltage source of value $V_g$. Since the voltage across the capacitor begins at $V_o$ and is to end at zero, the value of $V_g$ must be one half or less of the output voltage $V_o$ for the switch voltage $V_s$ to reach zero. Therefore, in this implementation ($V_x=0$), the following constraint exists for achieving ZVS on the power switches:

$$V_o(\text{Boost}) > 2\,V_g(\text{Boost}) \text{ for } V_x=0$$

Stage 5: The switch voltage $V_s$ reaches zero, and antiparallel diode $D_s$ conducts carrying the current previously flowing through capacitor $C_s$. With the switch voltage back to zero, the voltage across the input inductor now equals $V_g$. Consequently, the voltage reflected to the secondary winding equals $N_x V_g$. The voltage across the auxiliary inductor $L_x$ is $-N_x V_g$, so that its energy is returned to source $V_g$ through the current transformer action of the input inductor $L_{in}$. The current in the auxiliary switch $S_x$ decreases at a rate of $N_x V_g/L_x$.

Stage 6: Once the auxiliary current has returned to zero, it remains at zero due to the uni-directional current flow capability of auxiliary switch $S_x$. The input inductor Lin now behaves as a conventional filter choke, and a positive di/dt equal to $V_g/L_{in}$ causes energy from source $V_g$ to be stored in the magnetizing current of $L_{in}$ in preparation for the next switching cycle.

From the above operation description, it is evident that ZVS operation of the power switches is dependent on the output to input voltage ratio $V_o/V_g$. This ratio must be greater than two (2). In FIG. 7, $V_g$=90 V and $V_o$=400 V, and as expected, ZVS is achieved. However, in FIG. 8, $V_g$=250 V and $V_o$=400 V, and ZVS is not achieved. Nevertheless, in some applications, $V_x$=0 will be an appropriate choice. The greatest advantages of this configuration are that auxiliary switch $S_x$ will never need an isolated gate drive (regardless of the topology), and the peak voltage on $S_x$ will be minimal. For the Boost converter (1), the maximum voltage is $N_x(V_o-V_g)$. In addition, the turns ratio $N_x$ may be selected such that the optimum voltage/current balance for the switch is achieved. For a given voltage, rating of switch $S_x$, it is desirable to minimize the rms current flowing through it. This may be done by increasing $N_x$ until the maximum tolerable voltage is reached. The value of the auxiliary current at the time the passive power switch $S_p$ turns off will equal $I_m/N_x$.

EXAMPLE #2

$V_x=V_g$

In the first example, it was found that ZVS could not be achieved for all input and output voltages. However, by properly choosing $V_x$, ZVS will be extended for all input and output voltages achievable by a conventional hard-switched Boost converter (i.e. $V_o > V_g$). Consider for example $V_x=V_g$. The operation stages will be identical in this configuration, but the auxiliary circuit will contain a voltage source $V_x$ of value equal to the input voltage $V_g$. During stage 4, however, the equivalent circuit comprising an L-C circuit in series with voltage source is modified: Instead of a value of $V_g$, the voltage source now has a value of $V_g-V_x/N_x=(1-1/N_x)V_g$. For switch voltage $V_s$ to reach zero for all output voltages greater than the input voltage $V_g$, $(1-1/N_x)V_g$ must be less than $V_o/2$. Therefore, if $N_x$ equals two (2), then $V_g(1-\frac{1}{2})=V_g/2<V_o/2 \rightarrow V_g<V_o$. Therefore, with $N_x>2$, ZVS of the power switches may be achieved for all output voltages greater than the input voltage.

In addition to achieving ZVS over a wide voltage and load range, several other differences have occurred by setting $V_x=V_g$ and $N_x=2$: The maximum voltage stress on the auxiliary switch $S_x$ has increases from $V_o-V_g$ to $N_x(V_o-V_g)-V_g=2V_o-V_g$. However, the rms current through the auxiliary circuit is nearly one-half of its previous value: When the auxiliary switch current equals $I_m/2$ (as compared to $I_m$ in example #1)—where $I_m$ equals the DC magnetizing current through the primary of the input inductor $L_{in}$—the passive power switch $S_p$ turns off. Therefore, although a higher voltage device will need to be used for $S_x$, the current flowing through it will be significantly less, thereby not incurring any addition loss.

Figure 9:
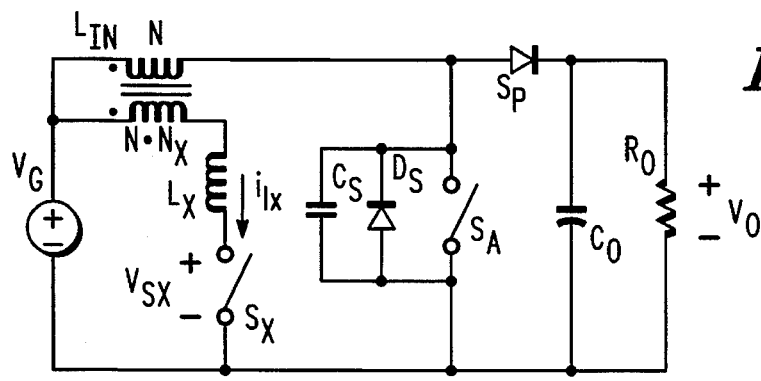
FIG. 9 shows a ZVT Boost Converter where $V_x=V_g$ according to the present invention.
Figure 10:
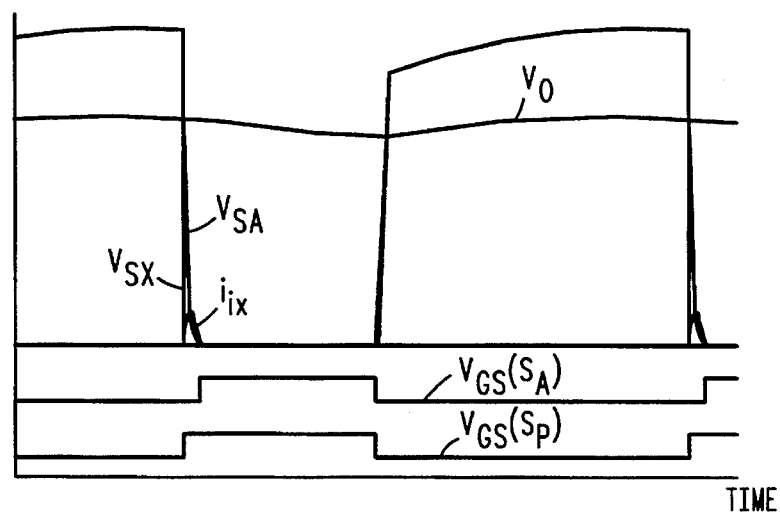
FIG. 10 depicts key waveforms of the converter of FIG. 9 with $V_g=250$ V, $V_o=400$ V

To implement this configuration, there is no need for an additional voltage source $V_x$. The actual input source $V_g$ may be used, as shown in FIG. 9. Key waveforms of this configuration shown in FIG. 10 verify that ZVS is achieved for $V_g$=250 V, $V_o$=400 V.

EXAMPLE #3

$V_x=V_s$

Figure 11:
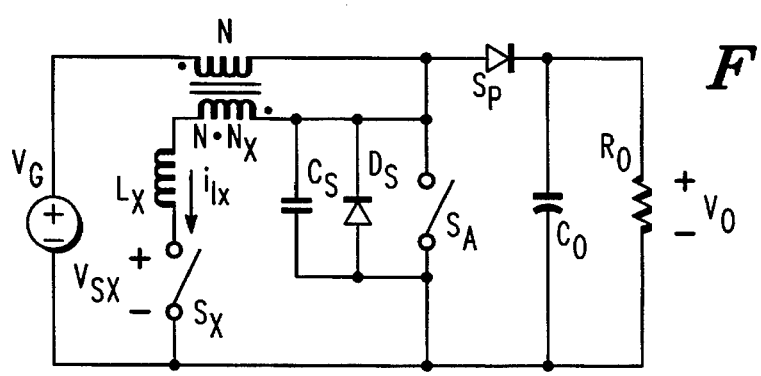
FIG. 11 shows a ZVT Boost Converter where $V_x=V_s$ according to the present invention.
Figure 12:
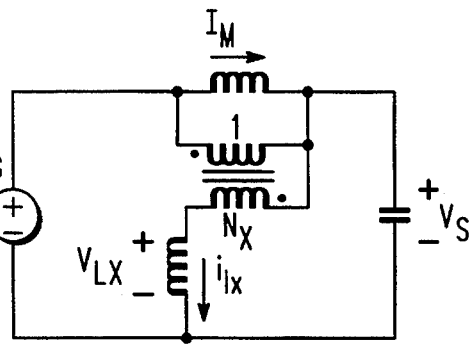
FIG. 12 shows stage no. 4 of the ZVT Boost Converter of FIG. 11 showing the discharging of $C_s$.

To demonstrate the wide variety of possible implementations for voltage source $V_x$, we present another configuration which results in a performance similar to that of example #2. Suppose $V_x=V_s$, then when $S_p$=on, $V_x=V_o$, and when $S_A$=on, $V_x=0$. This configuration is depicted in FIG. 11. During stage #4—as described in example #1—the equivalent circuit will be as shown in FIG. 12. $v_{Lx}=(1+N_x)V_s-N_x V_g$, and therefore for ZVS operation, $$\frac{N_x}{N_x+1}\,V_g < \frac{V_o}{2}\,.$$

If $N_x$ is chosen to be one (1), then the relationship becomes $V_g < V_o$ as before. Although $N_x=1$ and not 2, yet the same lower current stresses in the auxiliary circuit exist as in example #2. The reason for this is that during stage #4 as shown in FIG. 12, capacitor $C_s$ is in effect the auxiliary source $V_x$. Therefore, current flowing in the auxiliary circuit flows from the switch capacitance $C_s$ adding to the current reflected to the primary of input inductor $L_{in}$ which also flows from capacitance $C_s$. These two current paths which both flow through $C_s$ effectively result in the auxiliary current being mirrored to twice its value as it flows through capacitance $C_s$. Again as in example #2, the voltage stress on auxiliary switch $S_x$ is $N_x(V_o-V_g)+V_o=2V_o-V_g$.

EXAMPLE #4

$V_x$=as determined

In this example, we wish to select $V_x$ such that several constraints are satisfied. Mainly, we would like the positive and negative voltage applied across the auxiliary inductor $L_x$ to be equal in magnitude. This will result in minimizing the rms current through the auxiliary circuit. Secondly, we would like the maximum voltage stress on the auxiliary switch $S_x$ to equal $V_o$. This will allow us to rate this switch with the same voltage as the main active power switch $S_A$. Referring to FIG. 6, we calculate the voltage across the auxiliary inductor assuming $S_x$ is on as:

$$v_{L_x} = N_x(V_s - V_g) + V_x(v_s)$$

where $V_x$ is written generally as a function of the active power switch voltage $v_s$. This is done to accommodate the situation that arose in example #3, where $V_x = v_s$. We are particularly interested in the voltage across the auxiliary inductor $L_x$ when $S_A$ is on, as well as when $S_p$ is on. Therefore:

$$v_{L_x}(S_A = \text{on}) = V_x(S_A = \text{on}) - N_x V_g$$

$$v_{L_x}(S_p = \text{on}) = V_x(S_p = \text{on}) + N_x(V_o - V)$$

this can be equivalently written as:

$$v_{L_x}(S_A = \text{on}) = V_x(v_s = 0) - N_x V_g$$

$$v_{L_x}(v_s = V_o) = V_x(v_s = V_o) + N_x(V_o - V_g)$$

Since we wish for these voltages to be balanced and equal in magnitude to $V_o$ (so as to limit the auxiliary switch voltage to $V_o$, we must satisfy $$-V_o = V_x(v_s = 0) - N_x V_g$$

$$+V_o = V_x(v_s V_o) + N_x(V_o - V_g)$$

therefore, $V_x$ may be solved:

$$V_x(v_s = 0) = -V_o + N_x V_g$$

$$V_x(v_s = V_o) = N_x V_g + (1 - N_x) V_o$$

If in addition, we wish to have the current stress in the auxiliary circuit to be small as in examples #2 and #3, we may wish to either increase the turns ratio, or connect the switch capacitance $C_s$ as part of the auxiliary source $V_x$. Choosing the latter configuration, we let $N_x = 1$ and define $V_x$ as $V_x = V_s + V'_x$, where $V'_x$ is yet to be calculated as:

$$V'_x(v_s = 0) = -V_o + N_x V_g - 0 = V_g - V_o$$

$$V'_x(v_s = V_o) = N_x V_g + (1 - N_x) V_o - V_o = V_g - V_o$$

Figure 13:
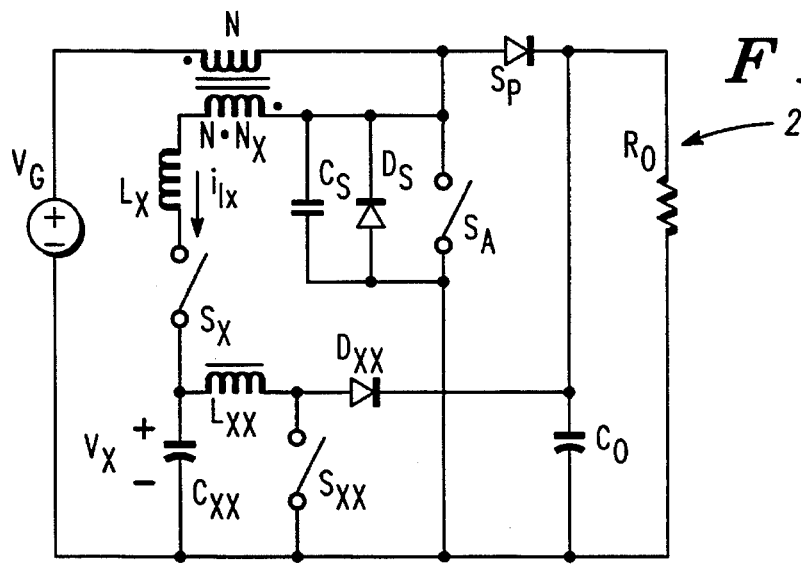
FIG. 13 shows a ZVT Boost Converter where $V_x=V_g-V_o$ according to the present invention.

Therefore, we find that if the auxiliary source $V_x$ is equal to $V_g - V_o$ with $N_x = 1$, then the peak voltage stress on the auxiliary switch $S_x$ will be $+V_o$, and the current stress in the auxiliary circuit will be optimal for the given voltage stress. Although there are many ways to implement the source $V_x$, the Boost converter (2) of FIG. 13 shows one possible implementation. A small auxiliary Boost converter consisting of components $C_{xx}$, $L_{xx}$, $S_{xx}$, and $D_{xx}$ generated the $V_x$ voltage source. The driving signal for switch $S_{xx}$ can be shown to be the complement of the driving signal for active power switch $S_A$.

Many implementations are possible for voltage source $V_x$. As long as the source meets the two criterion mentioned above, a switching converter using the Magnetic Feedback ZVT technique will operate as described above. As was demonstrated in the four exemplary configurations, $V_x$ can be either a constant or a varying source, as well as either an independent or dependent source. Source $V_x$ may be an external source created by some auxiliary circuitry as shown in example #4, or $V_x$ may be a source which already exists within the converter. Although all of the above examples make use of the existing filter inductor of the converter, this ZVT soft-switching technique is not restricted to this type of implementation. As will now be shown, an auxiliary filter inductor (other than the existing filter inductors of basic converter configuration) may be used to implement this ZVT soft-switching technique. This may be an attractive approach if it is undesirable to have a chopping effect on the current of an existing filter inductor.

Figure 14:
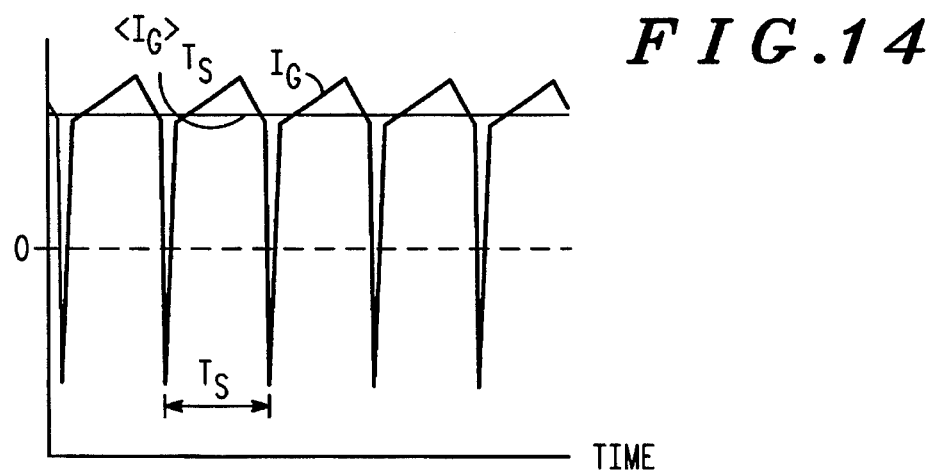
FIG. 14 depicts the typical input current of a ZVT Boost Converter using Magnetic feedback.

Recall that as current flows through the auxiliary circuit, a proportional current is mirrored to the primary of the filter inductor. In the Boost converter, this corresponds to reflecting the auxiliary current back to the input voltage source. The net effect is that prior to each active power switch turn-on commutation, the input current effectively resonates negatively from its DC value to a value near or less than zero. Although the duration of this resonant cycle is short (typically less than 10% of the switching period), nevertheless added high frequency noise is introduced at the input source. Typical input current to a Boost converter is shown in FIG. 14. A possible application for using an auxiliary filter inductor is in "Power Factor Correction." A Boost converter operated as a power factor correcting circuit may require a smooth and undisturbed continuous input current. In this application, an auxiliary filter inductor may be desired.

The auxiliary filter inductor according to the present invention may be very simply implemented without effecting the basic operation of the Magnetic Feedback ZVT technique. The auxiliary magnetic component can be a small two winding transformer. The auxiliary filter inductor is placed in the circuit as follows: One end of its primary winding is connected to the node shared by both the active power switch $S_A$ and the passive power switch $S_p$. The second end of the primary winding is connected to an auxiliary high frequency capacitor which is in turn connected to any other point in the converter circuit such that the two requirements defining voltage source $V_x$ are satisfied. Mainly that $$\frac{di_{Lx}}{dt} = \begin{cases} > 0, S_P = \text{on} \\ < 0, S_A = \text{on} \end{cases} \quad \text{and} \quad \frac{di_{Lx}}{dt} \propto -\frac{di_c}{dt}.$$

Figure 15:
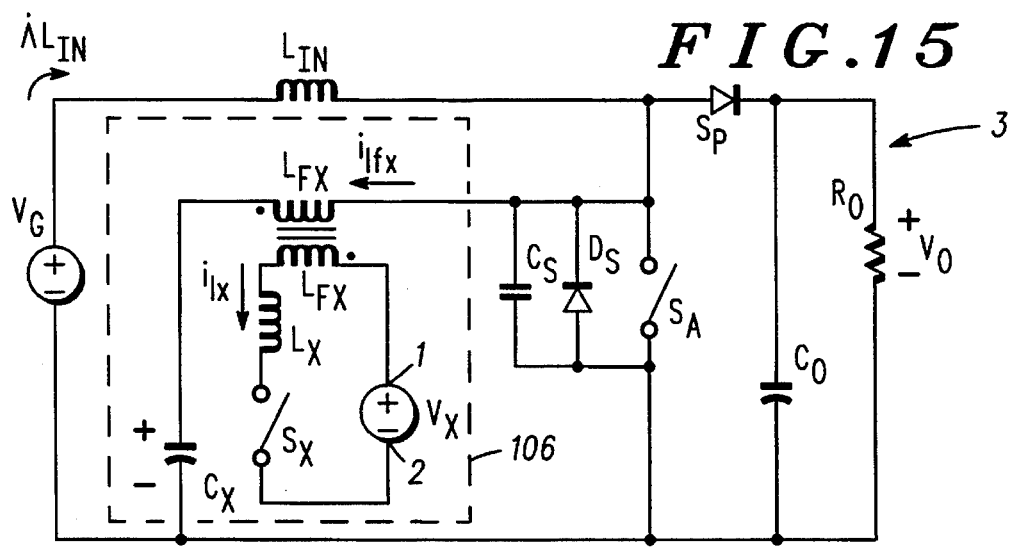
FIG. 15 shows ZVT Boost Converter using auxiliary filter inductor for attaching auxiliary ZVT soft-switching circuitry according to the present invention.

Connected to the secondary winding of the auxiliary inductor is the auxiliary circuit described previously. The implementation is shown for the Boost converter (3) in FIG. 15. The added filter inductor $L_{fx}$ should be chosen such that the magnetizing current flowing through it does not incur substantial losses. In the simplest implementation, $C_x$ may be made large enough so that a near DC voltage is maintained across it. In the case of the boost converter (3) of FIG. 15, the voltage on $C_x$ will equal the input voltage $V_g$ since neither $L_{fx}$ nor $L_{in}$ can support an average DC voltage. Other implementations where capacitor $C_x$ is much smaller, thus incurring a voltage ripple across it may also be considered.

Figure 16:
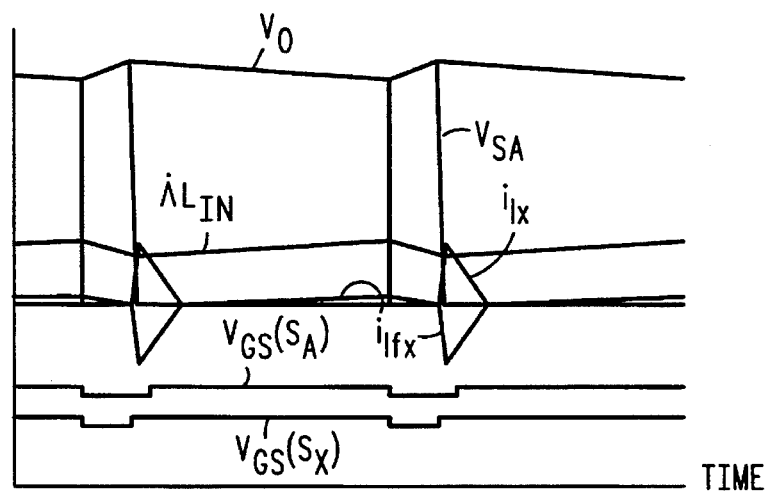
FIG. 16 depicts the key waveforms of the converter of FIG. where $V_x=V_s$.

As can be seen from the simulated waveforms in FIG. 16, the input current to the Boost converter is no longer chopped as in FIG. 14. The current flowing in the primary of the auxiliary filter inductor $L_{fx}$ consists of the mirrored secondary current minus a small DC magnetizing current. This DC current flows from auxiliary capacitor $C_x$ so that charge-seconds balance through the capacitor is satisfied. Since the rms current through this auxiliary inductor $L_{fx}$ is small, it is expected that its size will be small relative to the primary filter inductor(s) of the converter.

Figure 17:
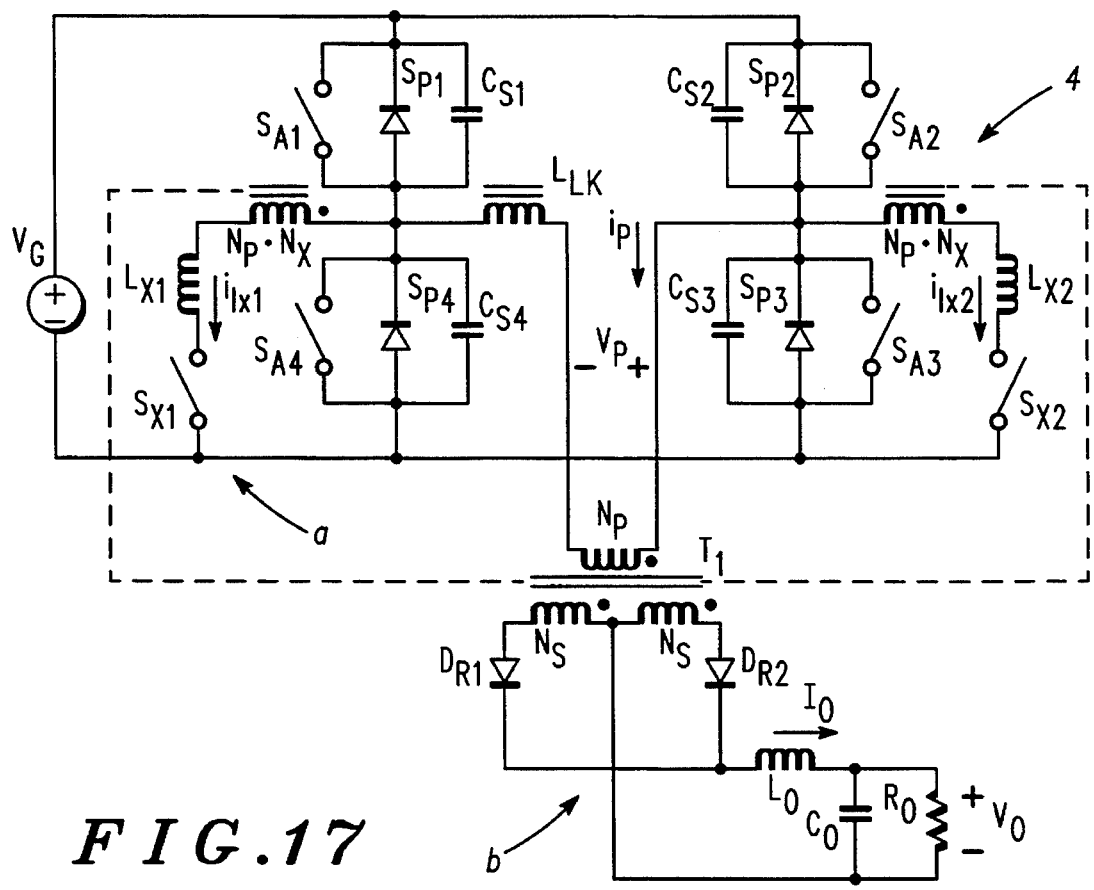
FIG. 17 shows the ZVT Full-Bridge Forward Converter using the isolation transformer for coupling the auxiliary circuitry.
Figure 18:
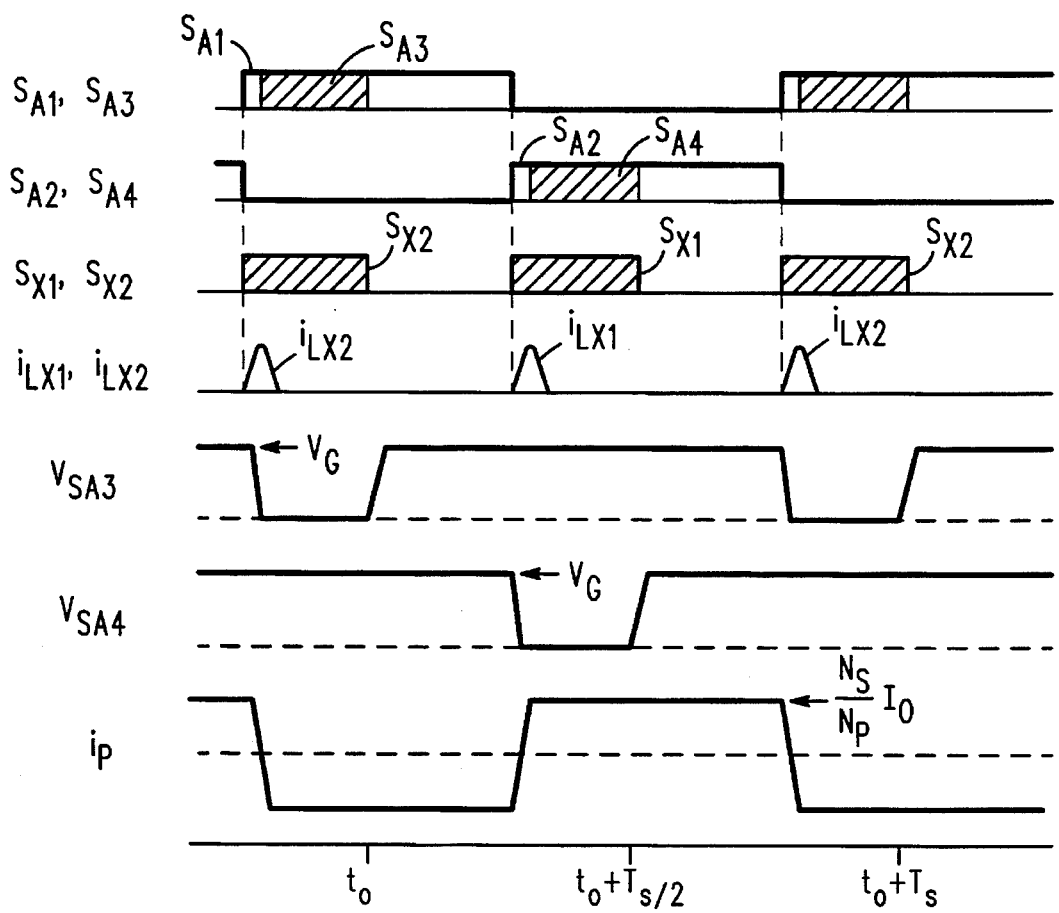
FIG. 18 shows the key waveforms of the converter of FIG. 17.

As described above, the auxiliary winding of the auxiliary circuit of the invention need not be wound on a filter inductor of the existing power converter. As set forth above, the winding may be wound on an auxiliary filter inductor, or as will now be shown, it may be wound on the isolation transformer of the power converter. To describe this type of implementation, the operation of the full-bridge forward converter (4) of FIG. 17 will be explained. Key waveforms are shown in FIG. 18 to clarify the explanation. It is to be understood that this implementation is merely exemplary as one of ordinary skill can readily ascertain.

Essentially, in a full-bridge converter (4), two legs make up the switching bridge. Each leg consists of two active power switches, and each active power switch has connected across it a passive power switch (such as diodes). Due to the inductive nature of the load, the lower active power switch in each leg may be turned off with ZVS, and consequently each upper passive power switch in each leg may be turned on with ZVS. An auxiliary circuit is utilized to turn on with ZVS the lower active power switch and to turn off with ZVS the upper passive power switch of each leg. Hence, two auxiliary circuits (a), (b) are used, each corresponding to one leg of the switching bridge.

Figure 32:
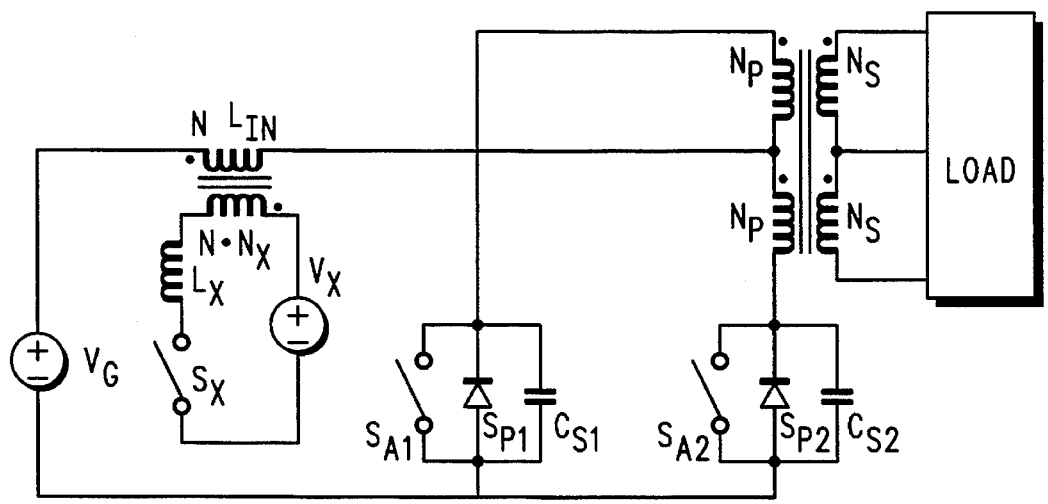
FIG. 32 shows an embodiment of the Magnetic feedback ZVT technique in a Current-Fed Push-Pull Converter.

The auxiliary circuits used in the converter of FIG. 32 each possess a voltage source $V_x$ equal to the voltage across the lower active power switch of each leg. This implementation of $V_x$ is similar to the implementation of example #3. The operation of the full-bridge converter (4) may be explained as follows: Assuming that switches $S_{A1}$ and $S_{A3}$ are on, and that the current $i_p$ flowing in the primary of the transformer $T_1$ is equal to minus the output current $I_o$ times $N_s/N_p$ where $N_s$ is the number of turns on the transformer secondary, and $N_p$ is the number of turns on the transformer primary, the following operation sequence occurs:

Stage 1 $[t_0-t_1]$: At time $t_0$, switch $S_{A3}$ turns off with ZVS due to the capacitance $C_{S3}$ across it. Also, switch $S_{x2}$ is turned off with ZCS. The voltage across switch $S_{A3}$ increases linearly until it reaches the input voltage $V_g$. The current in the primary remains constant at $-I_o N_s/N_p$.

Stage 2 $[t_1-t_2]$: The voltage across switch $S_{A3}$ reaches the input voltage $V_g$ and passive switch $S_{p1}$ turns on. Switches $S_{p2}$ and $S_{A1}$ carry the primary current $i_p=-I_o N_s/N_p$.

Stage 3 $[t_2-t_3]$: At time $t_2$ switch $S_{A1}$ is turned off and switch $S_{A2}$ is turned on both with ZVS. Auxiliary switch $S_{x1}$ is also turned on, but with ZCS. The voltage $v_p$ across the primary of transformer $T_1$ equals zero, therefore the voltage across both auxiliary windings is also zero. Consequently, the voltage across auxiliary inductor $L_{x1}$ equals the input voltage $V_g$. For simplifying the operation description, it is assumed that the leakage inductance $L_{lk}$ is negligible. However, it can be shown that even with leakage inductance, the converter still operates as desired. The current $i_{Lx1}$ flowing through the auxiliary inductor $L_{x1}$ begins to increase linearly. The current flowing in this auxiliary winding is also reflected to the primary of transformer $T_1$.

Stage 4 $[t_3-t_4]$: When the current $i_p$ in the primary reaches a value of $I_o N_s/N_p$, rectifying diode $D_{r1}$ turns off, effectively clamping the primary current. With this diode turned off, the primary of transformer $T_1$ is no longer shorted, thus allowing the voltage across switch $S_{A4}$ to begin decreasing as capacitors $C_{s1}$ and $C_{s4}$ resonate with inductor $L_{x1}$.

Stage 5 $[t_4-t_5]$: At time $t_4$ the voltage across switch $S_{A4}$ reaches zero, and passive power switch $S_{p4}$ turns on. The voltage across the primary of transformer $T_1$ is now equal to the input voltage $V_g$. When reflected to the auxiliary winding connected to inductor $L_{x1}$, this voltage equals $N_x V_g$, where $N_x$ is the ratio between the primary turns and the auxiliary turns of transformer $T_1$. Wwith the voltage across switch $S_{A4}$ equal to zero, the voltage across inductor $L_{x1}$ is negative causing the current $i_{Lx1}$ to decrease linearly.

Stage 6 $[t_5-t_0+T_s]$: At time $t_5$, the inductor current $i_{Lx1}$ reaches zero, the uni-directional current characteristic of switch $S_{x1}$ prevents the current from flowing negatively.

Meanwhile, the switching bridge applies a voltage $V_g N_s/N_p$ across the output filter consisting of inductor $L_o$, capacitor $C_o$, and load $R_o$.

Stages 7–12: At time $t_0+T_s$, switch $S_{A4}$ turns off with ZVS and switch $S_{x1}$ turns off with ZCS, and the operation over the following half-cycle is symmetrical with that of the first half-cycle.

Therefore it is shown that by using the ZVT Magnetic Feedback Technique, ZVS operation of the active power devices is accomplished. If the leakage inductance of transformer $T_1$ is negligible, then ZVS operation of the output rectifiers $D_{r1}$ and $D_{r2}$ will also result. If the leakage inductance is not negligible, then ZVS operation of the switching bridge devices is still accomplished, but ZCS operation of the output rectifiers will result.

The Magnetic Feedback ZVT technique of the invention has been demonstrated as implemented in the single ended Boost converter and the full-bridge forward converter. However, this soft-switching principle may be applied to any DC-to-DC, single-ended, half-bridge, or full-bridge configurations. In addition, this novel technique may be used in DC-to-AC converters, AC-to-DC converters, and AC-to-AC converters. In general, this soft-switching technique may be used to significantly decrease the switching losses of switching devices which are used in applying a switching voltage across an inductive load. Although this inductor has often been referred to as a filter inductor, it is noted that the inductor need appear only to maintain a substantially constant magnetizing current during the switching interval over which the auxiliary circuitry is active. Even this constraint is to be interpreted loosely, since a significant percentage change in the magnetizing current over the switch interval can still permit the proper operation of the auxiliary soft-switching circuitry.

Figure 19:
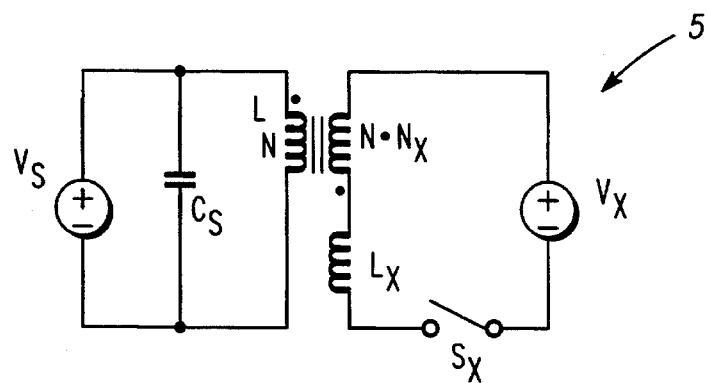
FIG. 19 shows a general application of the Magnetic feedback ZVT circuitry of the instant invention.

FIG. 19 shows an implementation of the novel ZVT soft-switching scheme. The switching circuit (5) to which the auxiliary soft-switching circuit is to be applied is represented by a switching voltage source $V_s$, a parasitic capacitance $C_s$, and an inductor L. This inductor may carry any combination of AC and DC current. The voltage source $V_s$ may take on many forms, however it is assumed that at a periodic rate, the voltage exhibits sharp changes, i.e. large dv/dt's. This would be the case for example in any switching bridge where the voltage waveform appears square in shape. During these dramatic voltage changes, energy stored in the parasitic capacitances (represented by $C_s$) is dissipated internally to the voltage source $V_s$. This type of switching loss prevents high frequency operation of the switching voltage source $V_s$. To recover this energy, the auxiliary circuit includes a secondary winding on inductor L, an auxiliary inductor $L_x$, and auxiliary switch $S_x$, and an auxiliary voltage source $V_x$, removes charge stored on the parasitic capacitance via the secondary winding of the inductor L.

Figure 20:
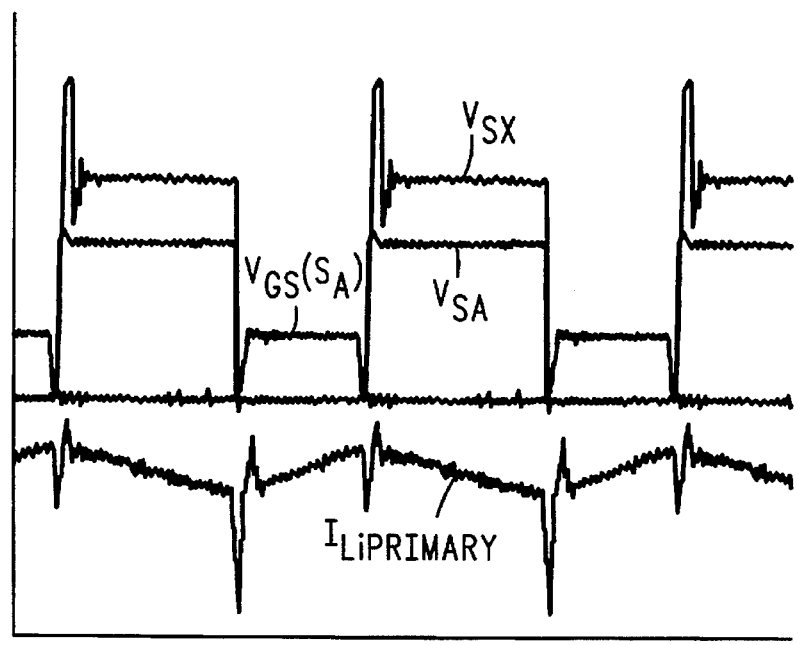
FIG. 20 depicts the experimental waveforms of a 250 kHz, 350 W, off-line power factor correcting boost converter using the Magnetic feedback ZVT circuitry
Figure 21:
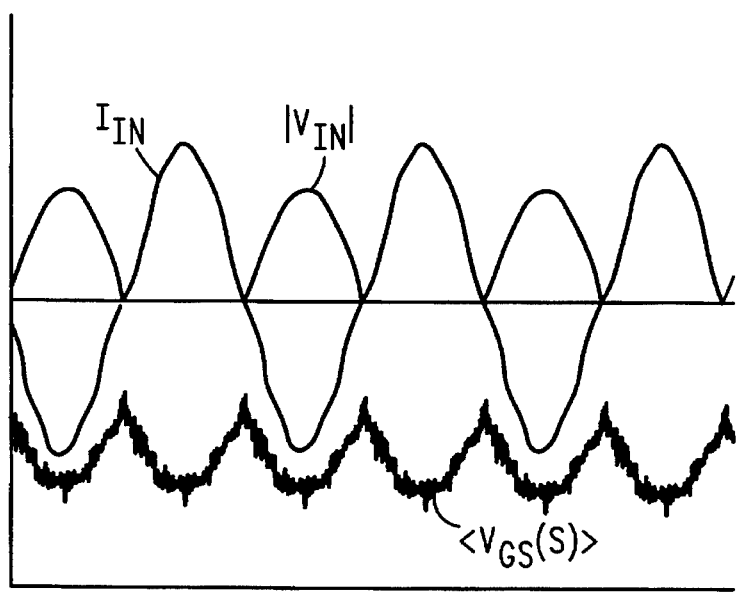
FIG. 21 shows AC line voltage and current of the experimental 250 kHz, 350 watt, offline power factor correcting boost converter using the Magnetic feedback ZVT circuitry
Figure 22:
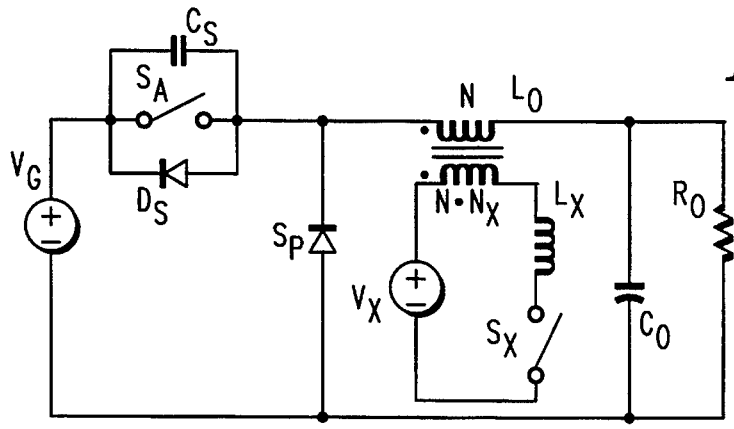
FIG. 22 shows an embodiment of the Magnetic feedback ZVT technique in the Buck converter.
Figure 23:
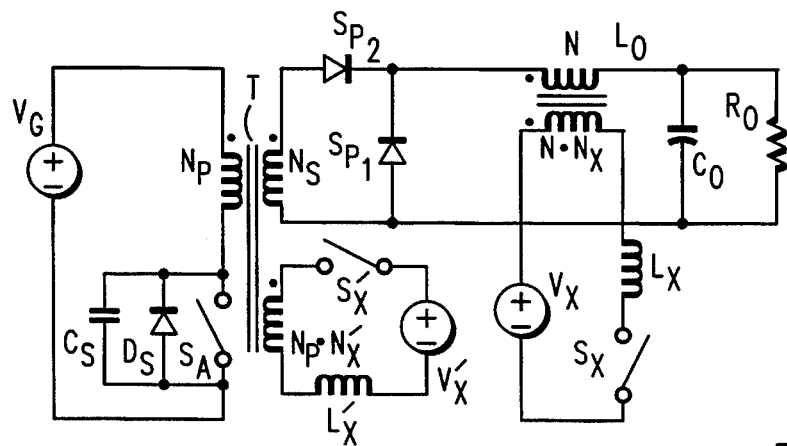
FIG. 23 shows an embodiment of the Magnetic feedback ZVT technique in the forward converter (transformer reset mechanism not shown).
Figure 24:
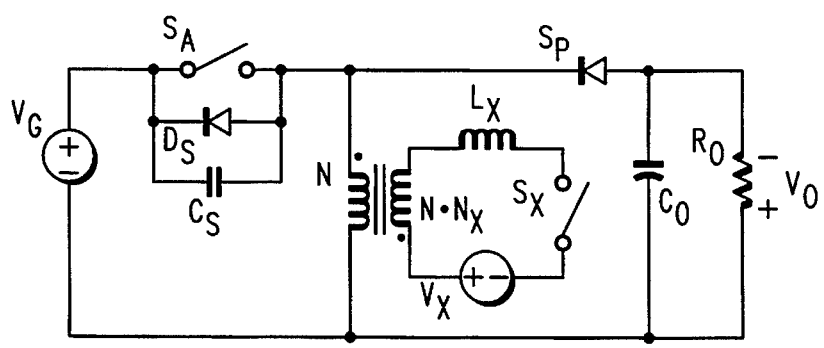
FIG. 24 shows an embodiment of the Magnetic feedback ZVT technique in the Buck-Boost Converter.
Figure 25:
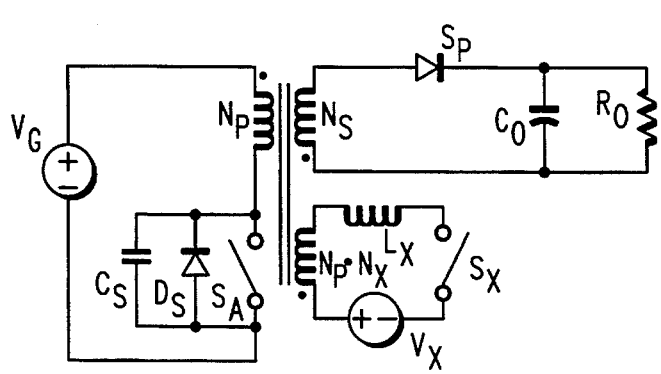
FIG. 25 shows an embodiment of the Magnetic feedback ZVT technique in the flyback converter.
Figure 26:
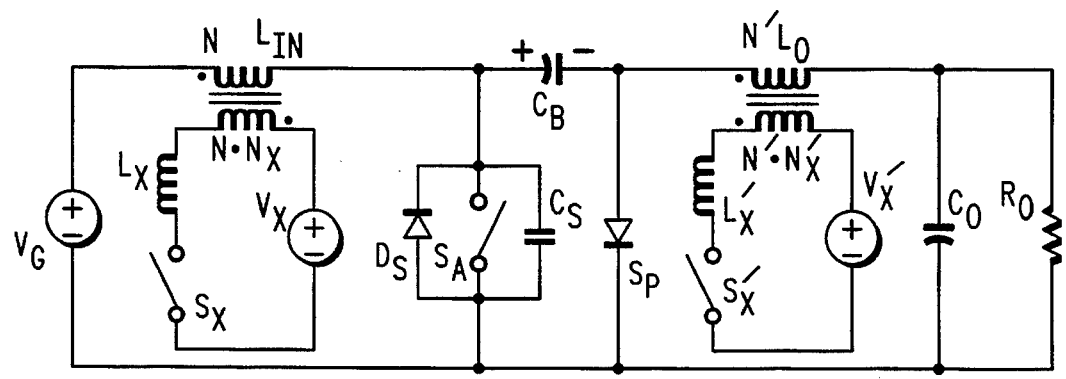
FIG. 26 shows an embodiment of the Magnetic feedback ZVT technique in the Boost-Buck Converter.
Figure 27:
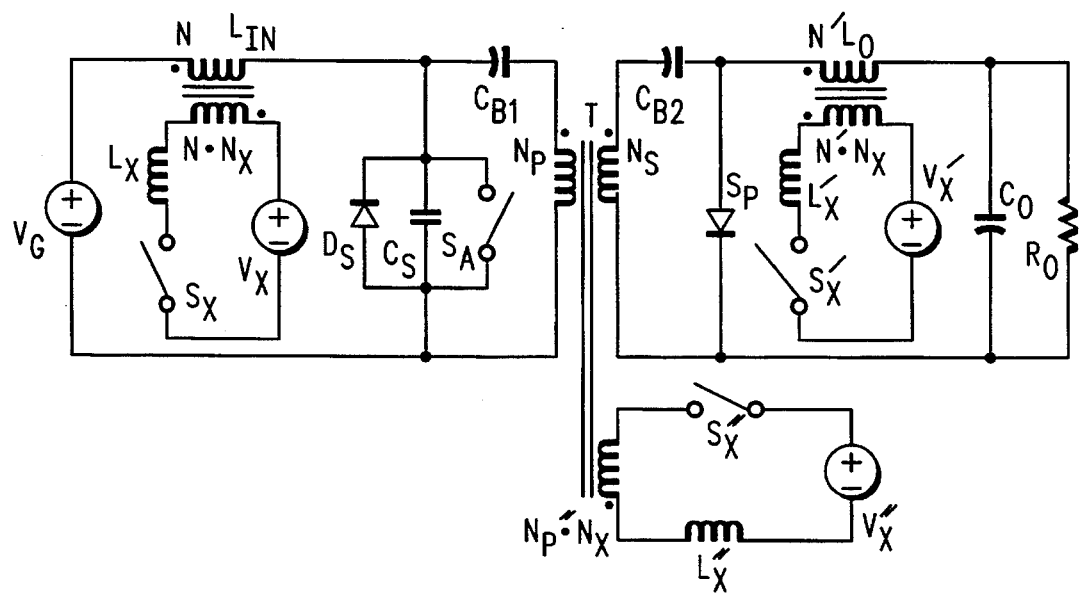
FIG. 27 shows an embodiment of the Magnetic feedback ZVT technique in the isolated Boost-Buck Converter.
Figure 28:
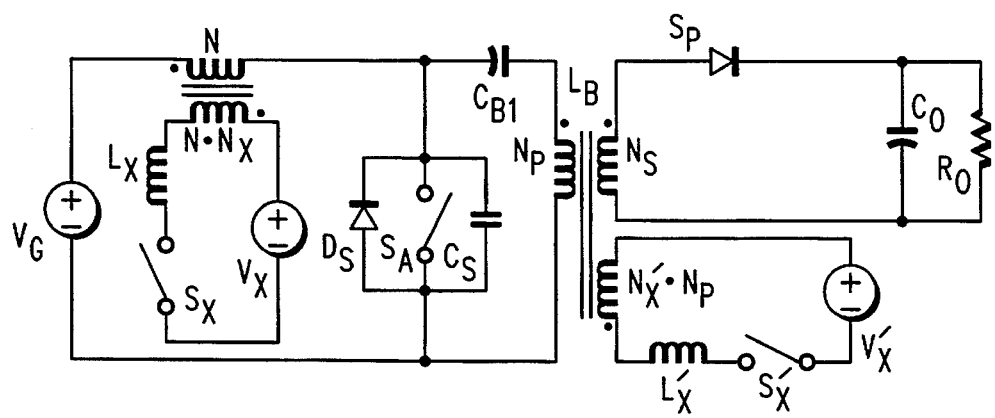
FIG. 28 shows an embodiment of the Magnetic feedback ZVT technique in the isolated SEPIC Converter.
Figure 29:
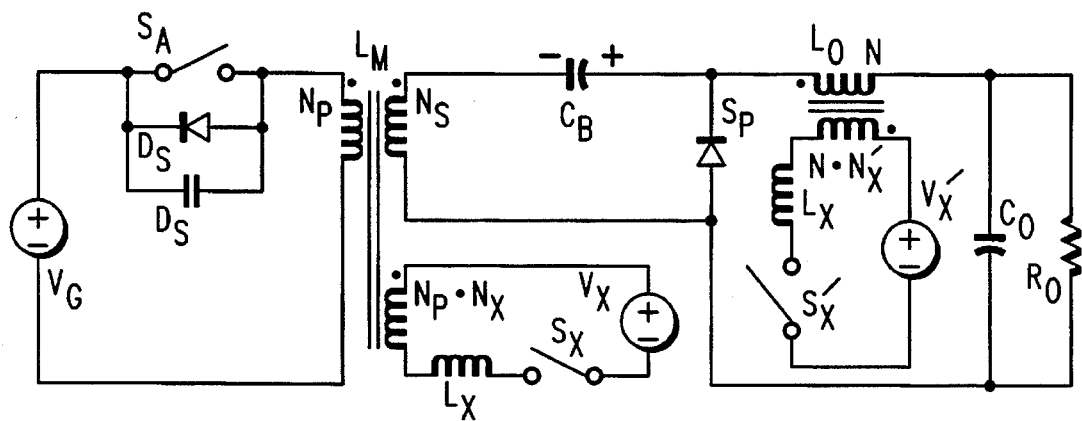
FIG. 29 shows an embodiment of the Magnetic feedback ZVT technique in the isolated Zeta Converter.
Figure 30:
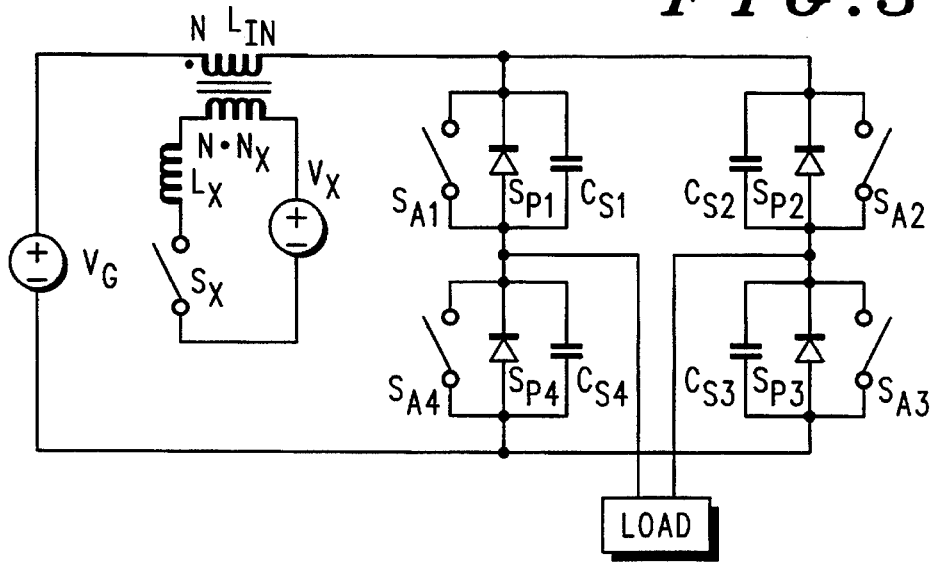
FIG. 30 shows an embodiment of the Magnetic feedback ZVT technique in Full-Bridge Current-Fed Converter.
Figure 31:
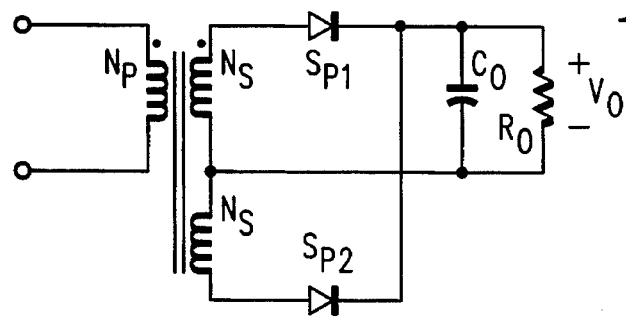
FIG. 31 depicts an exemplary load for converter of FIG. 30.
Figure 33:
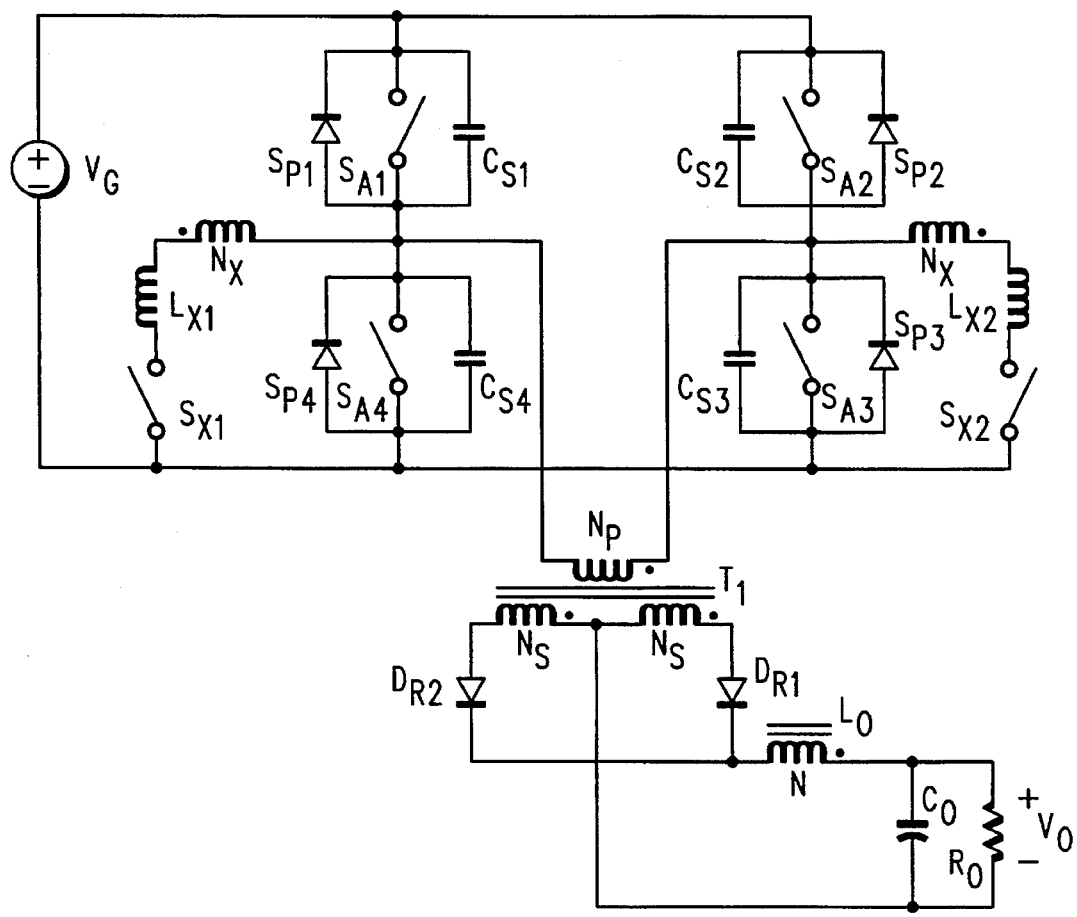
FIG. 33 shows an embodiment of the Magnetic feedback ZVT technique in a Full-Bridge Buck Converter. ($V_x$ is set to the voltage across $S_{A4}$ and $S_{A3}$).

For the sake of clarity, further novel implementations are provided in FIGS. 20–33: FIG. 20 shows the experimental waveforms of a 350 W off-line Power Factor correction circuit operating at 250 kHz using the Magnetic Feedback ZVT technique. The waveforms verify that ZVS of achieved on the main power transistor and diode. FIG. 21 shows the resulting AC line voltage and rectified AC current. FIGS. 22–29 show the Magnetic Feedback ZVT technique implemented in the Buck, Forward, Buck-Boost, Flyback, Boost-Buck, Isolated Boost-Buck, Isolated SEPIC, and Isolated Zeta converters, respectively. It is noted that the converters of FIGS. 23, 26, 28, and 29 possess two magnetic components, thus allowing the auxiliary circuitry to added in two possible locations. Both possible positions are shown in these figures with the auxiliary components of in each location distinguished by a prime or no-prime superscript. In FIG. 27, three magnetic components exist, thus three possible connections of the auxiliary circuitry are shown. FIG. 30 shows the Magnetic Feedback ZVT technique implemented in a current fed full-bridge converter. FIG. 31 shows a possible load implementation for the converter of FIG. 30. FIG. 32 shows the Magnetic Feedback ZVT technique implemented in a current-fed push-pull converter. The load may be AC or DC in nature. FIG. 33 shows the Magnetic Feedback ZVT technique implemented in a full-bridge Buck converter where $V_x$ equals the voltage across switches $S_{A4}$ and $S_{A3}$.

It is purposefully contemplated that the teachings of the present invention as hereinabove described not be limited to the described embodiments, as one of ordinary skill in the art will appreciate and can readily ascertain from the above disclosure in combination with the following claims.

I claim:

1. In a switching power converter comprising at least one active power switch and at least one passive power switch wherein said at least one active power switch turns off with substantially zero volts and said at least one passive power switch turns on with near zero voltage, a magnetic feedback circuit for achieving substantially zero voltage turn on of said at least one active power switch and for achieving substantially zero voltage turn off of said at least one passive power switch, said magnetic feedback circuit comprising:

i) a first inductor ($L_{fx}$) including first and second ends and a second inductor ($L_{fs}$) including first and second ends, said first inductor ($L_{fx}$) magnetically coupled to said second inductor ($L_{fs}$), said first end of said first inductor ($L_{fx}$) operatively connected to said switching power converter;

ii) a capacitor ($C_x$) operatively connected at one end to said second end of said first inductor ($L_{fx}$), and operatively connected at another end to said switching power converter;

iii) a voltage source ($V_x$) having first (1) and second (2) rails, said first rail (1) operatively connected to one end of said second inductor ($L_{fs}$);

iv) a third inductor ($L_x$) operatively connected at one end to another end of said second inductor ($L_{fs}$);

v) an active, uni-directional current switch ($S_x$) having first (a) and second (b) poles, said first pole (a) operatively connected to another end of said third inductor ($L_x$) and said second pole (b) operatively connected to said second rail (2);

wherein an increase in current through said uni-directional current switch necessitates a proportional decrease in current through said at least one passive power switch such that $$\frac{di_{sx}}{dt} \propto = \frac{di_{sp}}{dt}$$

where $i_{sx}$ represents the current through said uni-directional current switch and $i_{sp}$ represents the current through said at least one passive power switch;

and wherein current through said uni-directional current switch increases when said uni-directional current switch is on and said at least one passive power switch is on such that $$\frac{di_{sx}}{dt} > 0,$$

when said passive power switch is on and wherein current through said uni-directional current switch decreases when said uni-directional current switch is on and said at least one active power switch is on such that $$\frac{di_{sx}}{dt} < 0,$$

when said active power switch is on.

2. The magnetic feedback circuit of claim 1 wherein said third inductor ($L_x$) comprises coupling leakage inductance between said first inductor ($L_{fx}$) and said second inductor ($L_{fs}$).

3. The magnetic feedback circuit of claim 1 wherein said uni-directional current switch ($S_x$) comprises the series combination of a semi-conductor diode and a MOSFET.

4. The magnetic feedback circuit of claim 1 wherein said uni-directional current switch ($S_x$) comprises the series combination of a semi-conductor diode and an insulated gate bipolar transistor (IGBT).

5. A switching power converter comprising at least one magnetic component having at least one winding, at least one active power switch and at least one passive power switch wherein said at least one active power switch turns off with substantially zero volts and said at least one passive power switch turns on with near zero voltage, said switching power converter further comprising at least one magnetic feedback circuit for achieving substantially zero voltage turn on of said at least one active power switch and for achieving substantially zero voltage turn off of said at least one passive power switch, said at least one magnetic feedback circuit comprising:

i) a voltage source (Vx) having first (1) and second (2) rails;

ii) a first inductor ($N_x$) magnetically coupled to said at least one magnetic component, said first inductor ($N_x$) operatively connected at one end to said first rail;

iii) a second inductor ($L_x$) operatively connected at one end to another end of said first inductor ($N_x$);

iv) an active, uni-directional current switch ($S_x$) having first (a) and second (b) poles, said first pole (a) operatively connected to another end of said second inductor ($L_x$) and said second pole (b) operatively connected to said second rail (2);

wherein an increase in current through said uni-directional current switch ($S_x$) necessitates a proportional decrease in current through said at least one passive power switch such that $$\frac{di_{sx}}{dt} \propto = \frac{di_{sp}}{dt}$$

where $i_{sx}$ represents the current through said uni-directional current switch and $i_{sp}$ represents the current through said at least one passive power switch;

and wherein current through said uni-directional current switch ($S_x$) increases when said uni-directional current switch ($S_x$) is on and said at least one passive power switch is on such that $$\frac{di_{sx}}{dt} > 0,$$

when said passive power switch is on and wherein current through said uni-directional current switch decreases when said uni-directional current switch is on and said at least one active power switch is on such that $$\frac{di_{sx}}{dt} < 0,$$

when said active power switch is on.

6. The switching power converter of claim 5 wherein said uni-directional current switch ($S_x$) comprises the series combination of a semi-conductor diode and a MOSFET.

7. The switching power converter of claim 5 wherein said uni-directional current switch ($S_x$) comprises the series combination of a semi-conductor diode and an insulated gate bipolar transistor (IGBT).

8. The switching power converter of claim 5 wherein said active power switch comprises a MOSFET.

9. The switching power converter of claim 5 wherein said active power switch comprises an insulated gate bipolar transistor (IGBT).

10. The switching power converter of claim 5 wherein said second inductor ($L_x$) comprises coupling leakage inductance between said magnetic component and said first inductor ($N_x$).

11. The switching power converter of claim 5 wherein said passive power switch comprises a semi-conductor diode.

12. The switching power converter of claim 5 wherein said passive power switch comprises a synchronous rectifier.

13. A switching power converter comprising at least one active power switch and at least one passive power switch wherein said at least one active power switch turns off with substantially zero volts and said at least one passive power switch turns on with near zero voltage, said switching power converter further comprising at least one magnetic feedback circuit for achieving substantially zero voltage turn on of said at least one active power switch and for achieving substantially zero voltage turn off of said at least one passive power switch, said at least one magnetic feedback circuit comprising:

i) a first inductor ($L_{fx}$) including first and second ends and a second inductor ($L_{fs}$) including first and second ends, said first inductor ($L_{fx}$) magnetically coupled to said second inductor ($L_{fs}$), said first end of said first inductor ($L_{fx}$) operatively connected to said switching power converter;

ii) a capacitor ($C_x$) operatively connected at one end to said second end of said first inductor ($L_{fx}$), and operatively connected at another end to said switching power converter;

iii) a voltage source ($V_x$) having first (1) and second (2) rails, said first rail (1) operatively connected to one end of said second inductor ($L_{fs}$);

iv) a third inductor ($L_x$) operatively connected at one end to another end of said second inductor ($L_{fs}$);

v) an active, uni-directional current switch ($S_x$) having first (a) and second (b) poles, said first pole (a) operatively connected to another end of said third inductor ($L_x$) and said second pole (b) operatively connected to said second rail (2);

wherein an increase in current through said uni-directional current switch necessitates a proportional decrease in current through said at least one passive power switch such that $$\frac{di_{sx}}{dt} \propto -\frac{di_{sp}}{dt}$$

where $i_{sx}$ represents the current through said uni-directional current switch and $i_{sp}$ represents the current through said at least one passive power switch;

and wherein current through said uni-directional current switch increases when said uni-directional current switch is on and said at least one passive power switch is on such that $$\frac{di_{sx}}{dt} > 0,$$

when said passive power switch is on and wherein current through said uni-directional current switch decreases when said uni-directional current switch is on and said at least one active power switch is on such that $$\frac{di_{sx}}{dt} < 0,$$

when said active power switch is on.

14. The switching power converter of claim 13 wherein said third inductor ($L_x$) comprises coupling leakage inductance between said first inductor ($L_{fx}$) and said second inductor ($L_{fs}$).

15. The switching power converter of claim 13 wherein said active power switch comprises a MOSFET.

16. The switching power converter of claim 13 wherein said active power switch comprises an insulated gate bipolar transistor (IGBT).

17. The switching power converter of claim 13 wherein said passive power switch comprises a semiconductor diode.

18. The switching power converter of claim 13 wherein said passive power switch comprises a synchronous rectifier.

19. The switching power converter of claim 13 wherein said uni-directional current switch ($S_x$) comprises the series combination of a semi-conductor diode and a MOSFET.

20. The switching power converter of claim 13 wherein said uni-directional current switch ($S_x$) comprises the series combination of a semi-conductor diode and an insulated gate bipolar transistor (IGBT).

21. In a switching power converter comprising at least one magnetic component having at least one winding, at least one active power switch and at least one passive power switch wherein said at least one active power switch turns off with substantially zero volts and said at least one passive power switch turns on with near zero voltage, a magnetic feedback circuit for achieving substantially zero voltage turn on of said at least one active power switch and for achieving substantially zero voltage turn off of said at least one passive power switch, comprising:

i) a voltage source ($V_x$) having first (1) and second (2) rails;

ii) a first inductor ($N_x$) magnetically coupled to said at least one magnetic component, said first inductor ($N_x$) operatively connected at one end to said first rail;

iii) a second inductor ($L_x$) operatively connected at one end to another end of said first inductor ($N_x$);

iv) an active, uni-directional current switch ($S_x$) having first (a) and second (b) poles, said first pole (a) operatively connected to another end of said second inductor ($L_x$) and said second pole (b) operatively connected to said second rail (2);

wherein an increase in current through said uni-directional current switch ($S_x$) necessitates a proportional decrease in current through said at least one passive power switch such that $$\frac{di_{sx}}{dt} \propto = \frac{di_{sp}}{dt}$$

where $i_{sx}$ represents the current through said uni-directional current switch and $i_{sp}$ represents the current through said at least one passive power switch;

and wherein current through said uni-directional current switch ($S_x$) increases when said uni-directional current switch ($S_x$) is on and said at least one passive power switch is on such that $$\frac{di_{sx}}{dt} > 0,$$

when said passive power switch is on and wherein current through said uni-directional current switch decreases when said uni-directional current switch is on and said at least one active power switch is on such that $$\frac{di_{sx}}{dt} < 0,$$

when said active power switch is on.

22. The magnetic feedback circuit of claim 21 wherein said uni-directional current switch ($S_x$) comprises the series combination of a semi-conductor diode and an insulated gate bipolar transistor (IGBT).

23. The magnetic feedback circuit of claim 21 wherein said uni-directional current switch ($S_x$) comprises the series combination of a semi-conductor diode and a MOSFET.

24. The magnetic feedback circuit of claim 21 wherein said second inductor ($L_x$) comprises coupling leakage inductance between said magnetic component and said first inductor ($N_x$).

* * * * *

UNITED STATES PATENT AND TRADEMARK OFFICE
CERTIFICATE OF CORRECTION

PATENT NO. : 5,477,131
DATED : December 19, 1995
INVENTOR(S) : Joel P. Gegner

It is certified that error appears in the above-indentified patent and that said Letters Patent is hereby corrected as shown below:

Column 13, 14, 15 and 21,

In claim 1, 5, 13 and 21, in the equation the "=" should be a negative sign -- - --.

Signed and Sealed this

Sixteenth Day of April, 1996

BRUCE LEHMAN

Attest:

Attesting Officer

Commissioner of Patents and Trademarks